(12) United States Patent
Reilly

(10) Patent No.: US 6,665,946 B1
(45) Date of Patent: Dec. 23, 2003

(54) MACHINE ALIGNMENT SYSTEM

(76) Inventor: Paul Reilly, 560 N. Moorpark Rd., Suite 150, Thousand Oaks, CA (US) 91360

( * ) Notice: Subject to any disclaimer, the term of this patent is extended or adjusted under 35 U.S.C. 154(b) by 0 days.

(21) Appl. No.: 10/001,866

(22) Filed: Nov. 20, 2001

Related U.S. Application Data

(63) Continuation of application No. 09/345,928, filed on Jul. 1, 1999, now abandoned.
(60) Provisional application No. 60/093,155, filed on Jul. 17, 1998.

(51) Int. Cl.$^7$ ............................................. B23B 49/00
(52) U.S. Cl. ........................................... 33/640; 33/626
(58) Field of Search .......................... 33/626, 628, 640, 33/641, 562, 563, 565, 566, 555.2

(56) References Cited

U.S. PATENT DOCUMENTS

| | | | | |
|---|---|---|---|---|
| 4,443,950 A | * | 4/1984 | Cockeram | ..................... 33/628 |
| 5,207,007 A | * | 5/1993 | Cucinotta et al. | .............. 33/640 |
| 5,400,518 A | * | 3/1995 | Pawlowski | .................... 33/640 |
| 6,195,905 B1 | * | 3/2001 | Cole | ............................ 33/640 |
| 6,263,584 B1 | * | 7/2001 | Owens | ......................... 33/640 |

* cited by examiner

*Primary Examiner*—Diego Gutierrez
*Assistant Examiner*—Yaritza Guadalupe
(74) *Attorney, Agent, or Firm*—Allen A. Dicke, Jr.

(57) ABSTRACT

The machine alignment system comprises a master alignment plate having parallel faces. The alignment plate is mounted on a spindle in place of a saw blade to define the plane perpendicular to the spindle axis. The saw table surface is adjusted to be at a right angle with respect to the alignment plate, and the miter slot is adjusted to be parallel to the alignment plate. Parallelism is achieved by use of a slide bar in the miter slot and a dial indicator on the side bar to measure parallelism of the miter slot with respect to the master alignment plate. The slide bar is of adjustable width so that it can be adjusted to slide in the miter slot without slack. The fence and miter gage can each be adjusted using the master alignment plate as the reference.

20 Claims, 8 Drawing Sheets

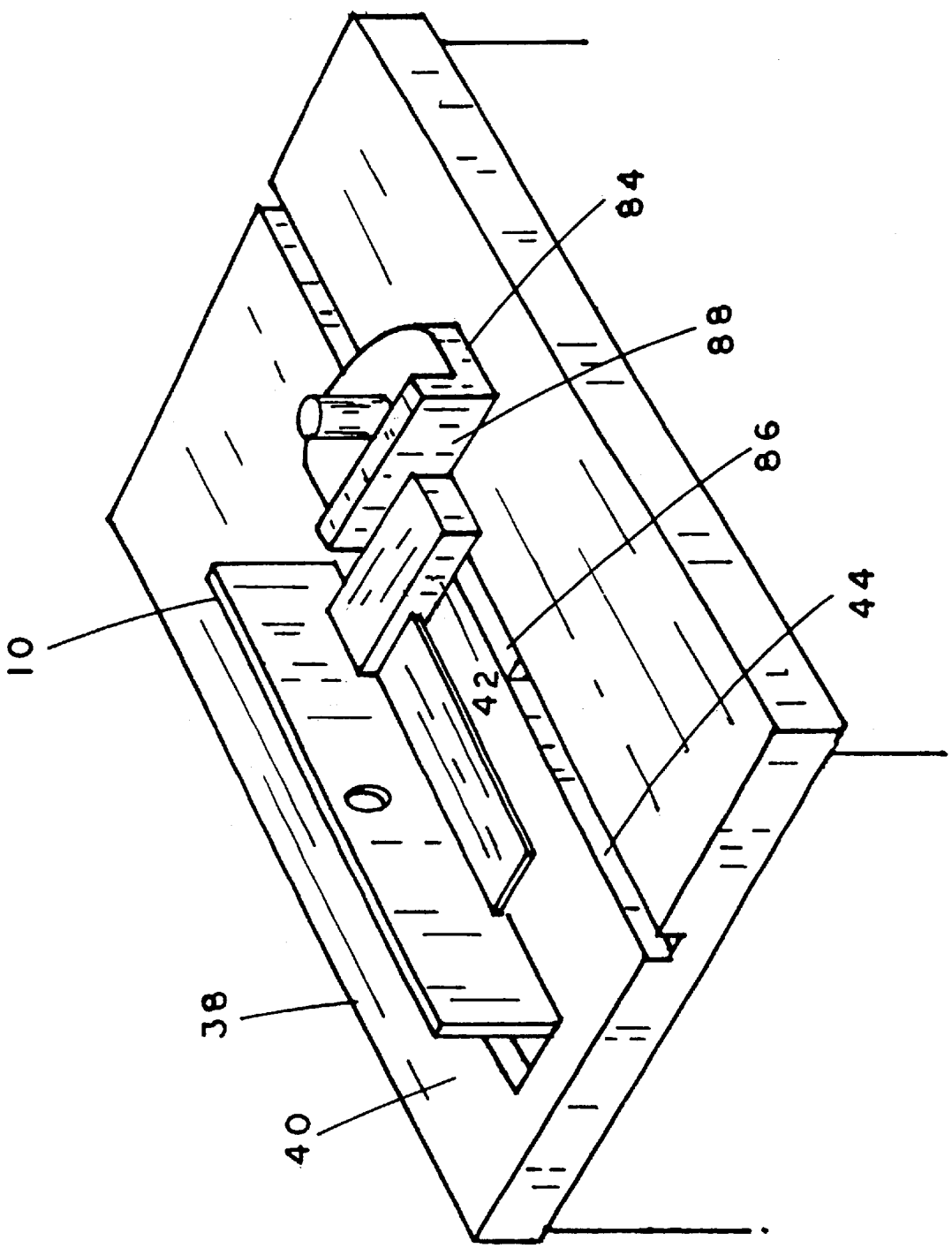

MACHINE ALIGNMENT SYSTEM

CROSS-REFERENCE

This application for Utility Patent relies for priority on Provisional Application Serial No. 60/093,155, filed Jul. 17, 1998, and relies for priority upon Utility Patent application, Serial No. 09/345,928, filed Jul. 1, 1999, now abandoned, of which this application is a continuation, the entire disclosures of which are incorporated herein by this reference.

FIELD OF THE INVENTION

This invention is directed to an alignment system for assuring correct alignment between the spindle, table, table miter slot, saw blade, rip fence and miter gauges in table saws, chop saws and the like so that the saws can be accurately set up to make clean accurate cuts. The system is useful for aligning and calibrating various equipment with tables, spindles, rip fences and miter gauges and miter slots where the machine may employ a circular cutting or abrasive blade.

BACKGROUND OF THE INVENTION

In woodworking and other crafts where a circular saw blade is used in cutting, the true running of the blade on a plane at a right angle to the spindle axis is necessary. Once the saw blade is rotating on an axis and running in a plane, the positioning of other saw parts can be accomplished with respect to the blade. In a table saw, the table must be at a right angle to that plane, and the table slot must be parallel to that plane. The table fence must be parallel to that plane, while the miter gage running in the table groove must be at a right angle to the plane.

Many attempts have been made to align and calibrate the various surfaces and guides of table saws, but most of these attempts have focused on only one or two of the required adjustments. They must all be addressed and solved in order to have accurate and safe running machinery. In the past, setting up the table saw has been very time-consuming and filled with a large amount of trial and error. As a result, the most successful alignment has been done by craftsmen who have had many years of experience. However, equipment of this type does not stay in adjustment while it is at work because the equipment is hard-working and is subject to heavy loads and constant pounding from the lumber that it has to cut, cross cut, rip and dado.

There is a need for equipment which permits one who is not particularly skilled in the art to adequately align and calibrate table saws and the like to their optimum adjustment. The procedure must be easy to accomplish and must allow the operator to adjust, tune and calibrate the saw quickly and accurately. The present invention is directed to aligning, calibrating and tuning up all aspects and elements of table saws and the like.

SUMMARY OF THE INVENTION

In order to aid in the understanding of this invention, it can be stated in essentially summary form that it is directed to a machine alignment system which is comprised of a substantially planar alignment plate, which occupies the position of the saw blade to provide a reference surface equivalent to the plane of rotation of the saw blade. A slide bar is sized and configured for smooth running in the table slot. The slide bar carries a dial indicator thereon so that the table slot may be made parallel to the plane of the alignment plate and, from thence, the fence may be made parallel to the table slot. With these machine alignment system components and a machinist's square, a table saw may be accurately adjusted.

It is, thus, a purpose and advantage of this invention to provide a machine alignment system which is simple to use. Substitution of the planar alignment plate for the saw blade is easy to accomplish, and the planar alignment plate provides a much longer and smoother reference surface and a much taller surface than the saw blade against which measurement and calibration can be made.

It is a further purpose and advantage of this invention to provide a flat surface on the planar alignment plate to measure parallelism, squareness and angles desired both in the bevel and the miter mode.

It is another purpose and advantage of this invention to provide a method for measuring and setting up the planar alignment plate so that the table slot may be parallel thereto and for positioning the saw table surface so that it is perpendicular to the plane of the planar alignment plate.

It is another purpose and advantage of this invention to provide a structure by which the planar alignment plate may be substituted for the saw blade in setting the various components of a table saw to the correct position to provide accuracy in setting the table and table slot with respect to the saw blade in the position desired.

It is another purpose and advantage to provide a machine alignment system which includes setting the miter gage to any precise desired angle by employing the planar alignment plate which represents the plane of the saw blade and setting the miter gage with respect thereto.

Other purposes and advantages of this invention will become apparent from a study of the following portions of the specification, the claims and the attached drawings.

BRIEF DESCRIPTION OF THE DRAWINGS

FIG. 9 is an isometric view showing the miter gage adjusted with respect to the alignment plate by use of a machinist's square.

DESCRIPTION OF THE PREFERRED EMBODIMENTS

Figure 1:
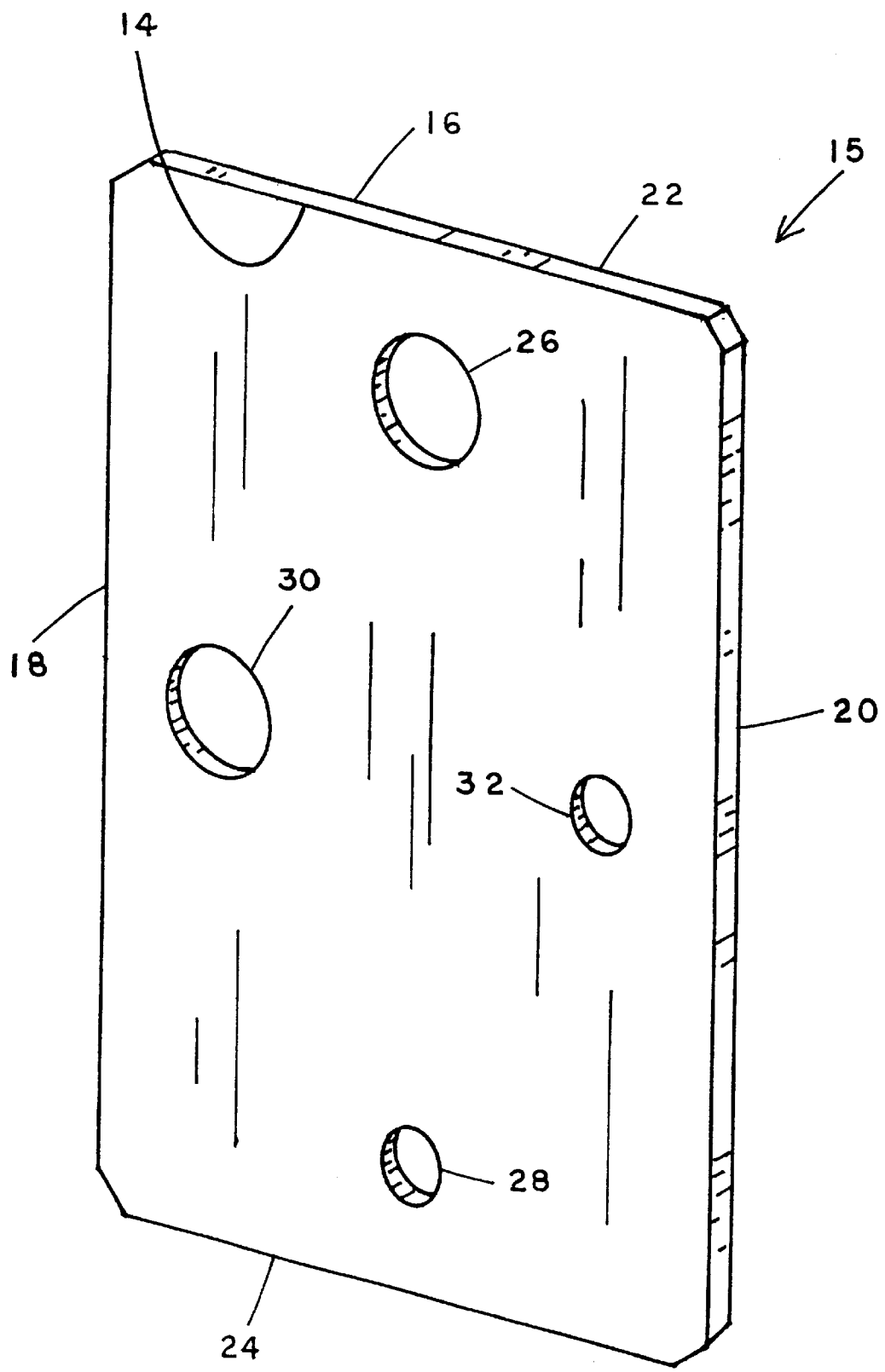
FIG. 1 is an isometric view of the planar alignment plate which serves as one component of the machine alignment system of this invention.
Figure 2:
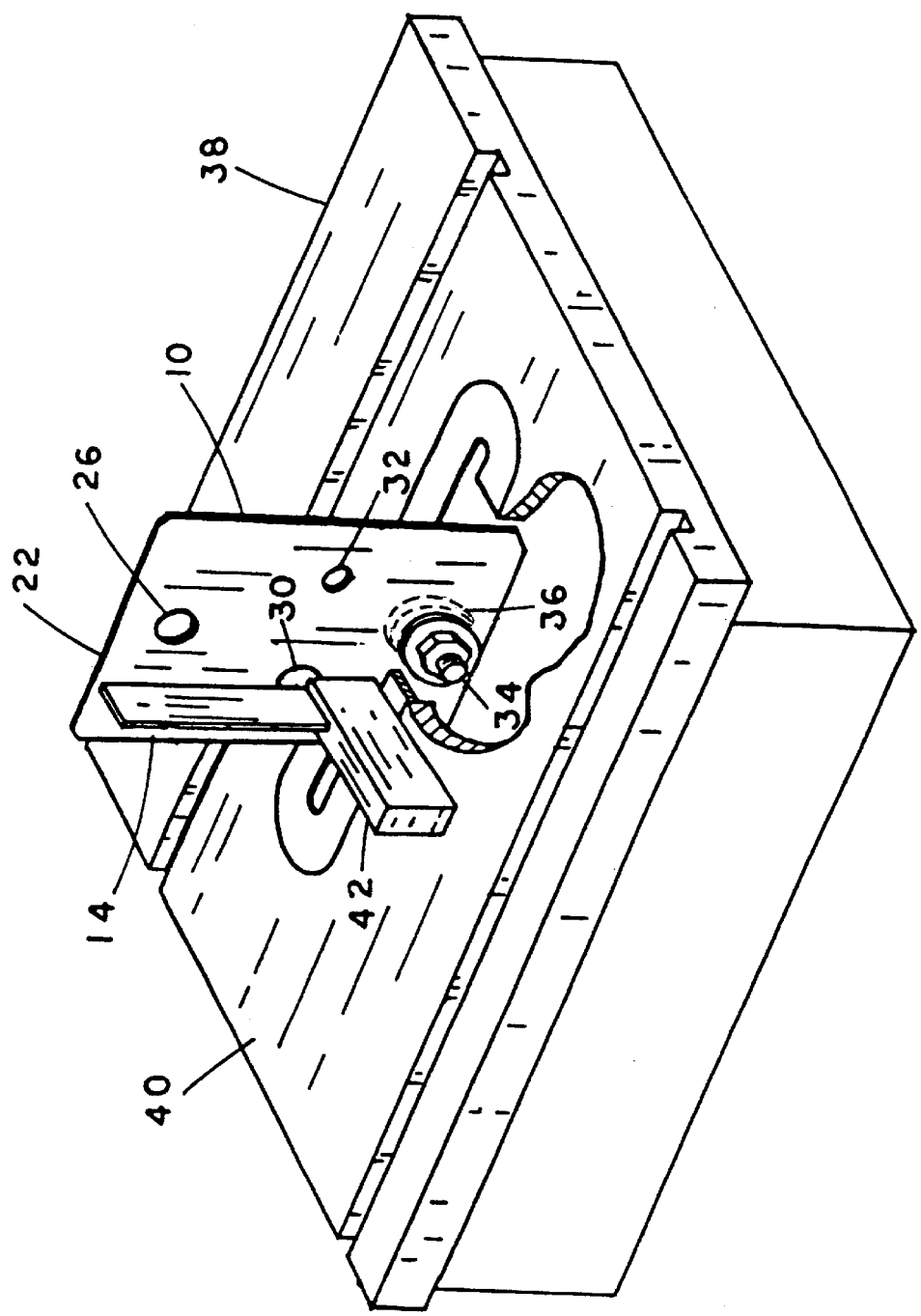
FIG. 2 is an isometric view showing the alignment plate clamped in the position of the saw blade for adjusting the table top to a right angle with respect to the planar alignment plate.

The machine alignment system of this invention is comprised of an alignment plate 10, shown in FIGS. 1 and 2, and a slide bar 12, shown in FIGS. 4, 5, 6 and 7. The alignment plate is a stiff rectangular plate configured so that its planar surfaces 14 and 16 are parallel to each other. The alignment plate is required to be stiff and have a flat surface. Metal, such as steel or aluminum, is suitable. Some synthetic polymer composition materials can be configured to meet the requirements. The alignment plate 10 is preferably rectangular and has long edges 18 and 20 parallel to each other. It also has its short edges 22 and 24 parallel to each other and preferably substantially at a right angle to the long edges. Midway between the long edges is a long center line upon which are located two mounting holes 26 and 28. These mounting holes are sized so that they may be received on most standard saw spindles. In good quality table saws, the saw spindles are either 5/8 inch in diameter or 1 inch in diameter. Thus, the larger mounting hole 26 is 1 inch in diameter, while the smaller hole 28 is 5/8 inch in diameter. Similarly, the short center line between edges 22 and 24 carry large mounting hole 30 and small mounting hole 32 thereon. Each of the mounting holes is spaced from its nearest edge a distance greater than the radius of the flange on the saw spindle.

Referring to FIG. 2, the master alignment plate 10 is mounted on saw spindle 34 on plate mounting hole 28 (FIG. 1) against spindle flange 36 (shown in dashed lines). The spindle nut and washer hold the master alignment plate against the spindle flange. In the alignment of the table saw having table 38, the runout of the spindle 34 and runout of the spindle flange 36 are measured from the table 38. Worn bearings or bent spindles cause runout from the true axis of the spindle. Presumably, these problems are already corrected by replacement of the bearings and/or spindle. Thus, the surface 14 lies in a plane which is at a right angle to the spindle axis. Since the alignment plate 10 is mounted on its lower hole 28, it extends a substantial distance above table 38. Machinist's square 42 is engaged against the surface 40, and the table 38 is adjusted so that the top surface of the table is at a right angle to the surface 14 and, thus, is parallel to the spindle axis. This is the first adjustment where the top surface of the saw table is put into a position wherein it is parallel to the spindle axis. The small hole 28 was engaged upon the spindle 34 because it was of correct size to do so. If the spindle were of the lager size, then the larger hole 26 would have been engaged thereon.

Figure 3:
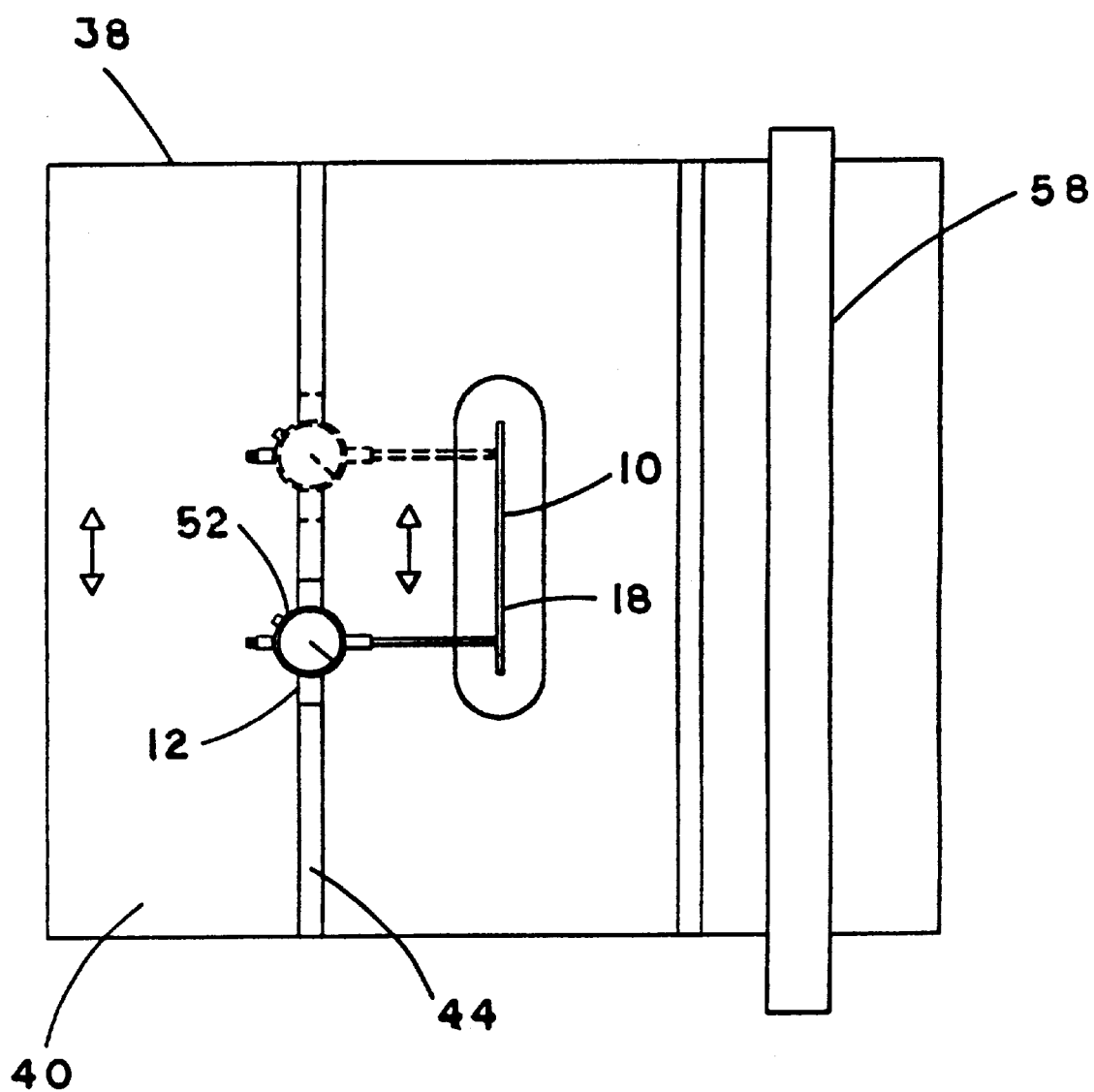
FIG. 3 is a plan view of a table saw showing the slide bar in the table groove of a table saw and carrying a dial indicator gage which acts on the alignment plate so that the table slot can be adjusted to be parallel to the plane of the saw blade.
Figure 4:
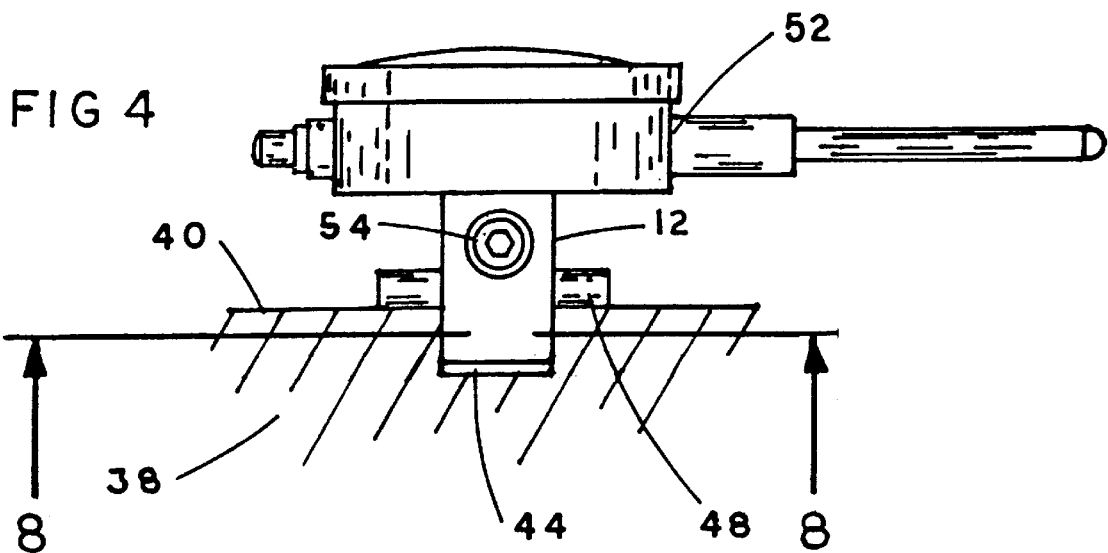
FIG. 4 is a side-elevational view of the slide bar carrying a dial indicator and positioned in the table slot.
Figure 5:
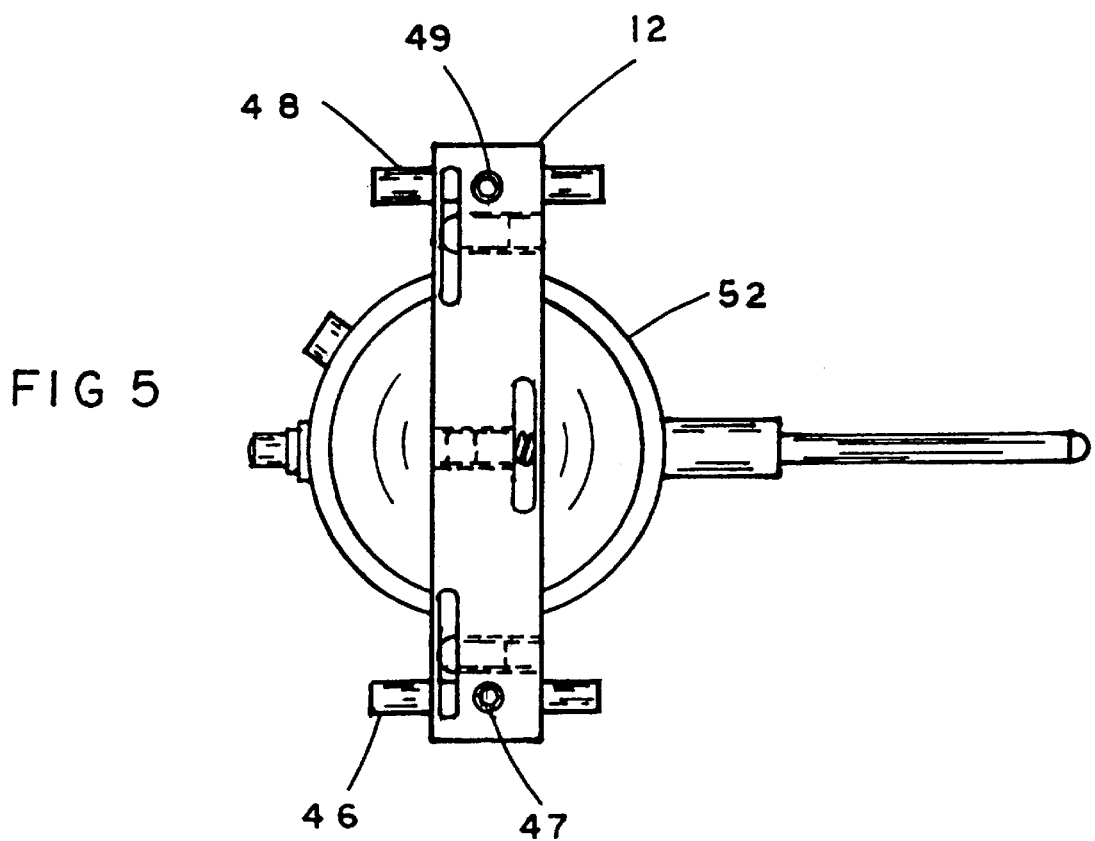
FIG. 5 is a bottom view of the slide bar with its dial indicator.

FIG. 3 shows the saw table 38 with its top surface 40. A miter slot 44 is cut into the top of the saw table in the direction substantially parallel to the alignment plate 10. In FIG. 3, the alignment plate is mounted on its side hole 32 so that its long edge 18 is in a direction substantially parallel to the miter slot. It is necessary to adjust the table within its already established plane by rotating the table on an axis perpendicular to FIG. 3. The planar position of the table top at a right angle to the alignment plate 10 is not disturbed, but the miter slot 44 is brought into parallelism with the alignment plate 10. This is accomplished with the aid of slide bar 12 (see FIGS. 4, 5, 6 and 7) sliding in the miter slot 44.

Figure 6:
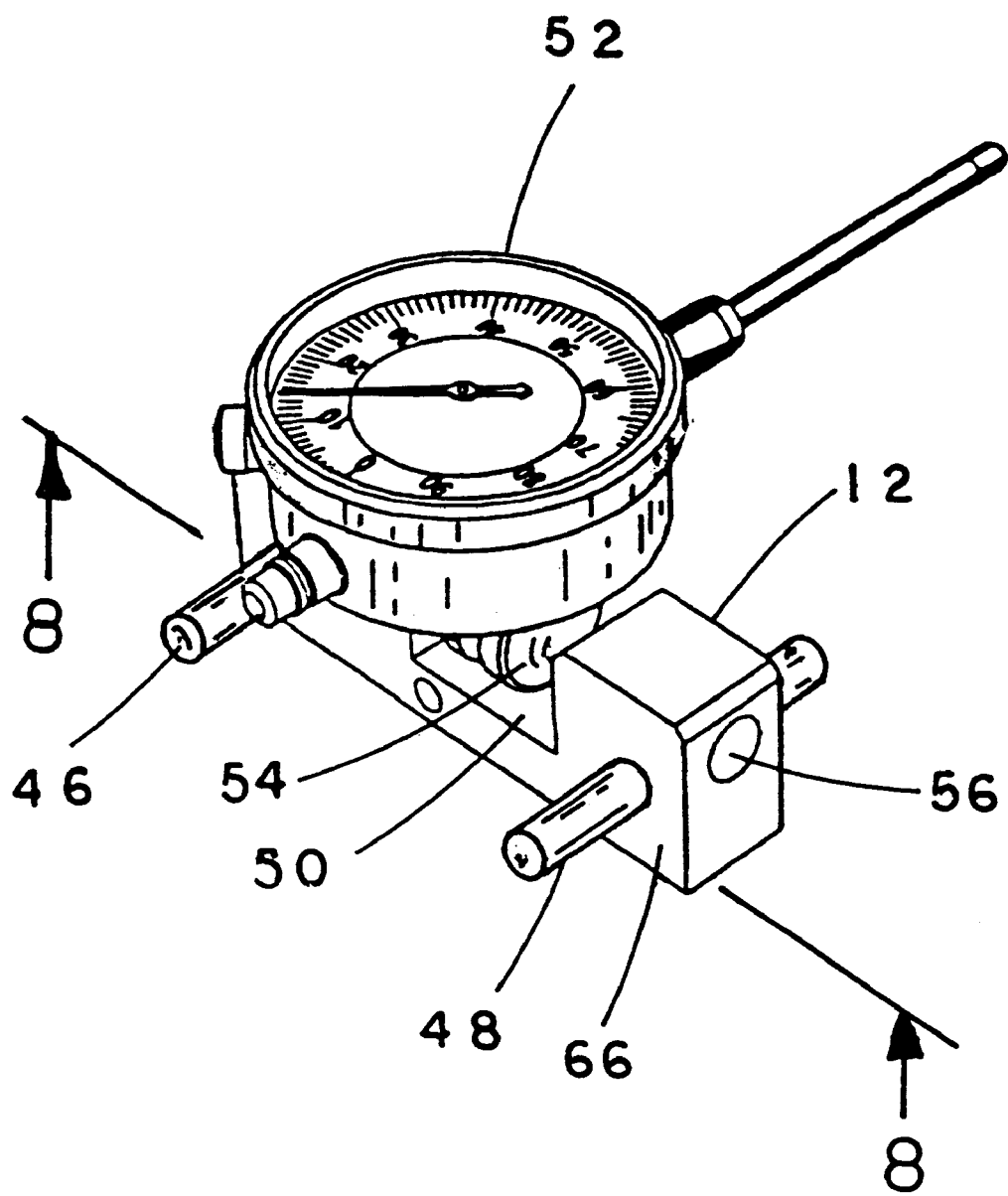
FIG. 6 is an isometric view thereof.

Slide bar 12 is a rectangular bar sized to fit within the miter slot. Cross pins 46 and 48 ride on the table surface 40 when the slide bar is in groove 44 to act as stops to limit the depth to which the slide bar 12 engages in miter groove 44, see FIG. 7. As shown in FIG. 8, set screws 47 and 49 hold the cross pins in place. This prevents engagement of the slide bar 12 against the bottom of slot 44, which may have sawdust deposits and reduce the smooth sliding character of the slide bar in its slot. As seen in FIG. 6, the slide bar has rectangular notch 50 therein into which the lug of dial indicator 52 extends. Dial indicator tightening screw 54 can be tightened by means of a screwdriver passing through access opening 56. As seen in FIG. 3, the slide bar is positioned in miter slot 44, and the dial indicator 52 measures against the planar surface 14 of the master alignment plate 10. The alignment plate 10 is positioned on the spindle so that its longer rectangular dimension is substantially parallel to the miter slot 44. The dial indicator is moved from end to end of the master alignment plate 10, as shown in dashed lines in FIG. 3. Misalignment is indicated upon the dial indicator. The table 38 is rotated to stay in the same plane, but move the miter slot 44 into parallelism with the master alignment plate. When parallelism is achieved, the table 38 is locked in position.

Figure 7:
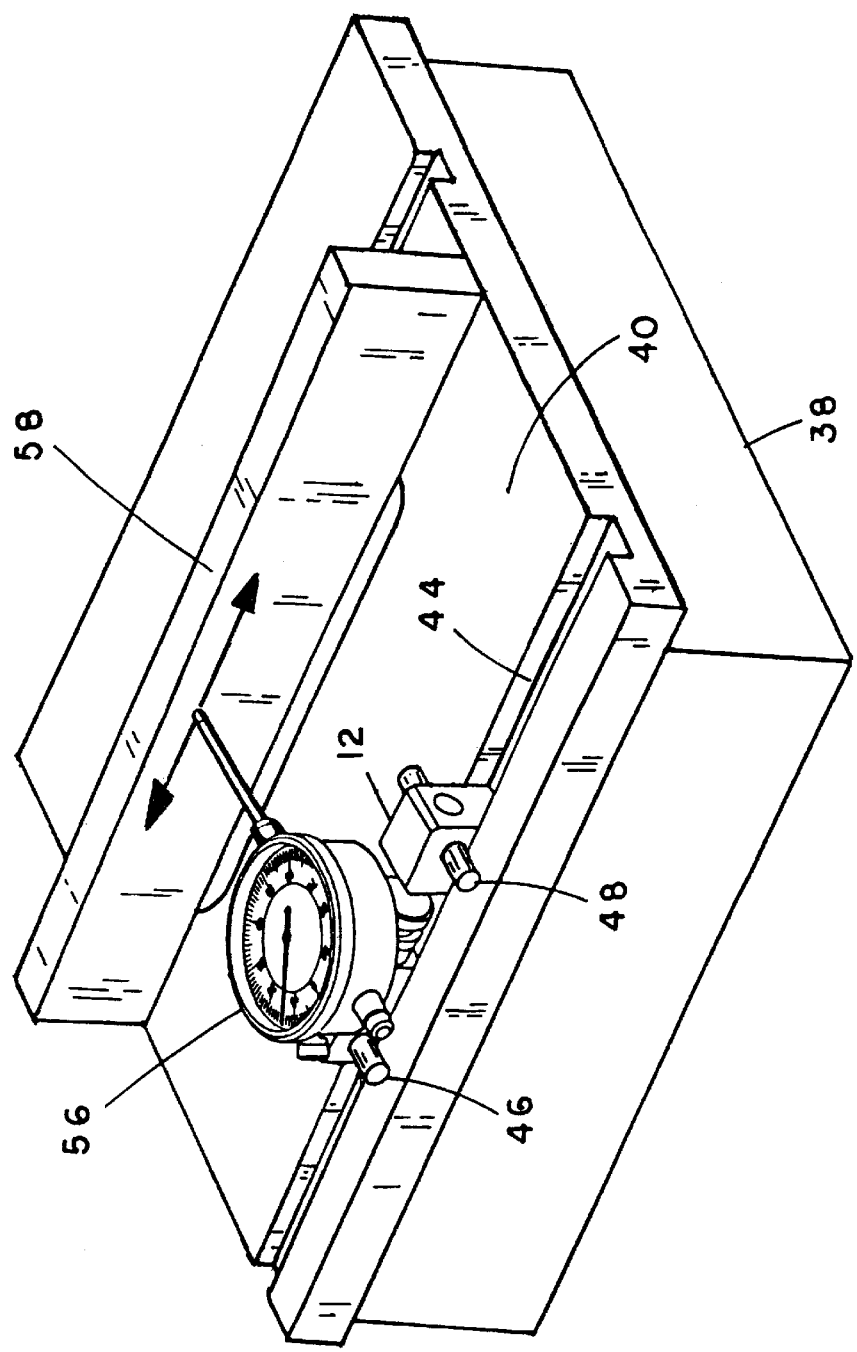
FIG. 7 is an isometric view thereof showing the slide bar in the table groove and its dial indicator engaged against the table fence for parallel and perpendicular adjustment of the table fence.
Figure 8:
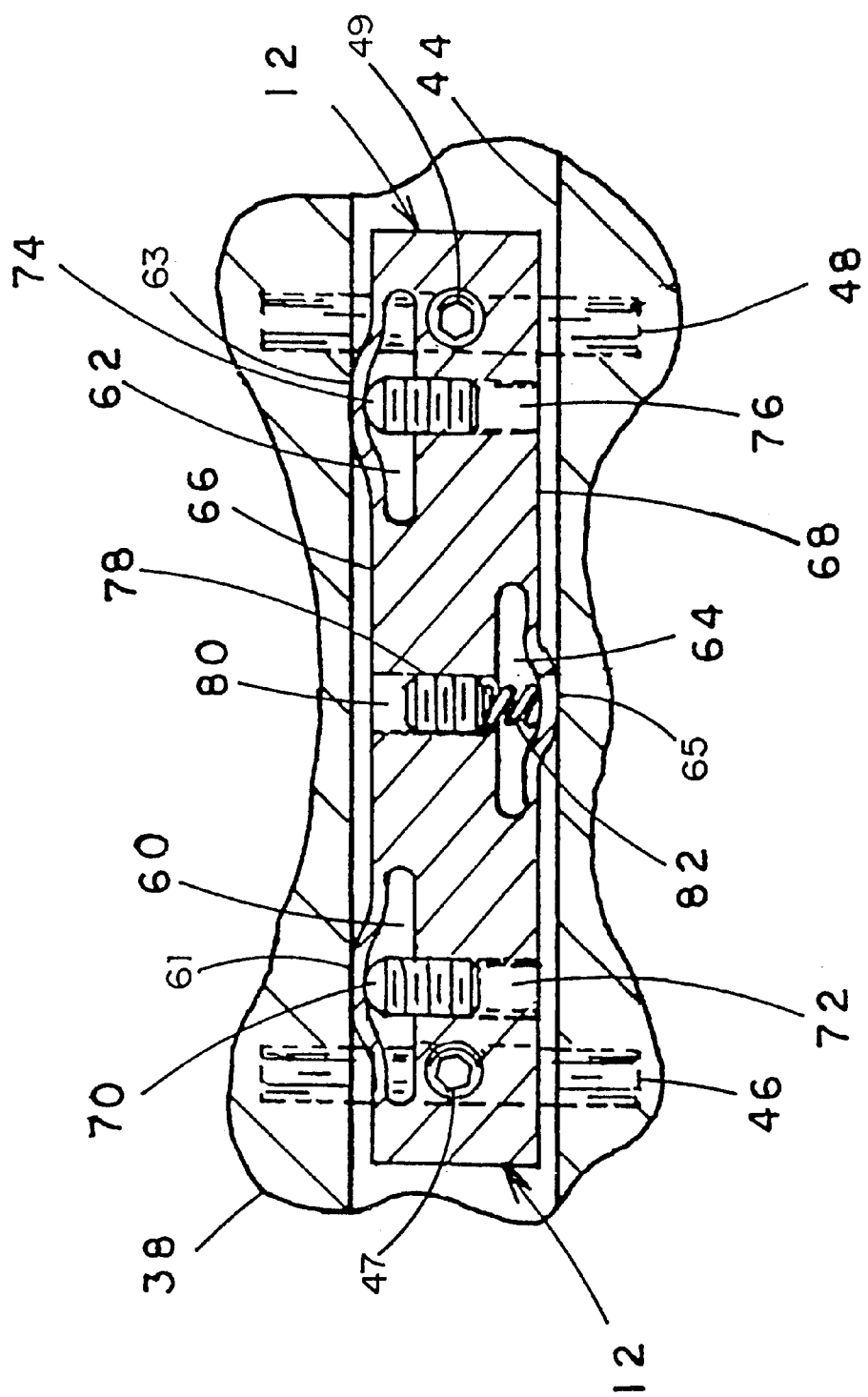
FIG. 8 is an upwardly looking section through the slide bar, as seen generally along the line 8—8 of FIGS. 4 and 6.

This setup permits the fence 58 to be made parallel to the miter slot by engaging the dial indicator 52 against the fence, see FIG. 7, and adjusting the parallelism of the fence so that the dial indicator shows parallelism. The creation of accurate relationships requires that the slide bar 12 be closely fit within the miter slot and move smoothly therealong without slackness or binding.

FIG. 8 shows a section through the slide bar 12 close to the bottom and looking upward. The slide bar 12 is made of a material which is strong and wear-resistant and which easily slides in the miter slot 44. The table 38 and its miter slot are often of cast iron and, thus, an appropriately selected synthetic polymer composition material is suitable for easy sliding therewith, for firm support and minimum wear.

The miter slot 44 in different brands of equipment may vary considerably from the nominal width. Thus, a width adjustment is provided on the slide bar 12. The pins 46 and 48 ride on the surface of the table. The section line in FIG. 8 is taken below the surface of the table and through the centers of the adjusting devices. Slots 60 and 62 are cut through the slide bar parallel to the back face 66 of the slide bar to leave webs 61 and 63, respectively. These slots are spaced from each other and positioned adjacent the ends of the slide bar. They may be positioned beneath the pins 46 and 48, as seen in FIG. 8. The thin webs 61 and 63, which are left between the slot and its adjacent face, are sufficiently flexible so that they can be distorted to adjust the overall width of the slide bar by enough to adjust the thickness of the slide bar enough to smoothly fit in the miter slot. Set screw 70 is threaded into set screw hole 72 to engage the web 61 outside of slot 60 to resiliently deflect the web. Similarly, set screw 74 is threaded into set screw hole 76 to engage against the web 63 outside of slot 62 to cause non-destructive deflection. These two set screws are tightened to take up most of the slack in the miter slot.

On the opposite front face 68 at the center of the front face, front slot 64 is cut upward in the body of the slide bar. Set screw 78 is threaded into set screw hole 80. The set screw 78 does not directly engage against the web 65 in front of slot 64. Instead, compression spring 82 engaged between the set screw 78 and the web 65. The spring permits small flexure of that web 65 should there be differences in width in the miter slot along its length. The set screw 78 is used for fine adjustment. When properly adjusted, the slide bar can smoothly slide the length of the miter slot without binding and without slack. In this way, the readings of the dial indicator 52 are sure to be accurate.

FIG. 9 shows the master alignment plate 10 in the saw slot in the table 38 of the table saw. In this case, the master plate is positioned so that its longer edges are substantially parallel to the table surface 40. The table alignment has already been accomplished so that the miter slot 44 is parallel to the alignment plate 10. Miter gage 84 has its guide 86 engaged in the miter slot 44. Squareness of the miter gage is accomplished by laying the machinist square 42 against the alignment plate 10 and against the face 88 of the miter gage. The face 88 is adjusted to the squareness defined by machinist square 42. In this way, an accurate right angle is achieved. If an angle other than 90 degrees is desired for cutting a bevel at the end of the board, instead of the machinist's square 42, an angle device of the appropriate angle can be used.

This specification describes a machine alignment system wherein the master alignment plate offers a clean precision surface so that measurement and alignment can be accomplished along the full length of the rectangular surface. This measuring dimension equals the full diameter of the standard blade used in the cutting operation. The master alignment plate provides a clean unobstructed surface from which to measure both horizontally and vertically to give the operator a clean reference surface. When the master alignment plate is positioned to its vertical position, it offers a generous surface to measure to permit horizontal adjustment of the table surface with respect to the vertical plate. The master alignment plate 10 is substantially symmetrical so that either face can be used for alignment, since both surfaces are precision-finished parallel to each other.

This invention has been described in its presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An alignment system mounted on a table saw which has a rotating spindle for carrying a circular saw blade, a table for supporting a workpiece with respect to the spindle, a miter slot in the table and a saw slot in the table to permit the saw blade to extend through the table, so that the alignment system permits alignment of the table with respect to the circular saw blade, comprising:

an alignment plate, said alignment plate having at least one substantially flat surface, said alignment plate being substantially rectangular with first and second long edges and first and second short edges, said long edges joining said short edges at substantially right angles and at least first and second holes through said alignment plate, each of said first and second holes being away from the center of said alignment plate, one of said holes being opposite said first short edge and the other of said holes being opposite another edge, said short edge being sufficiently short and said plate being sufficiently thin and extending through the saw slot so that said alignment plate is mounted with one of said first and second holes on the spindle so that said surface of said alignment plate is a plane at a right angle to the axis of the spindle and both said short and long edges being sufficiently long so that a portion of said alignment plate extends up through the saw slot when said alignment plate has either of said first and second holes mounted on the spindle; and a measuring device for mounting on the table to measure the angularity of the table with respect to said substantially flat surface of said alignment plate and the angularity of the miter plate to said surface of said alignment plate so that the table can be adjusted to a known angle in both a direction normal to the table surface and parallel to the miter slot with respect to said surface, at least one edge of said alignment plate being substantially aligned with the table to enhance measurement accuracy.

2. The machine alignment system of claim 1 wherein said plate is rectangular having two long edges and two short edges, respectively opposite each other and wherein said plate has first, second, third and fourth holes therethrough, said first and second holes being of the same size and said third and fourth holes being of the same size and being of a different size than said first and second holes.

3. The alignment system of claim 1 wherein said alignment plate has third and fourth holes in addition to said first and second holes and said holes are positioned so that when said alignment plate has said first hole mounted on the spindle one of said longer edges is at a right angle with respect to the table surface and one of said shorter edges is substantially parallel to said table when said second hole is mounted on the spindle.

4. The alignment system of claim 3 wherein said first and second holes are of the same size and said third and fourth holes are of the same size and are of a different size than said first and second holes.

5. The alignment system of claim 4 wherein said alignment plate is made of metallic or synthetic polymer composition material.

6. An alignment system mounted on a table saw which has a rotating spindle for carrying a circular saw blade, a table for supporting a workpiece with respect to the spindle, a miter slot in the table and a saw slot in the table to permit the saw blade to extend through the table, so that the alignment system permits alignment of the table with respect to the circular saw blade, comprising:

an alignment plate, said alignment plate having at least one substantially flat surface, said alignment plate being substantially rectangular with first and second long edges and first and second short edges, said long edges joining said short edges at substantially right angles and at least first and second holes through said alignment plate, each of said first and second holes being away from the center of said alignment plate, one of said holes being opposite said first short edge and the other of said holes being opposite another edge, said short edge being sufficiently short and said plate being sufficiently thin and extending through the saw slot so that when said alignment plate is mounted with one of said first and second holes on the spindle, said surface of said alignment plate is a plane at a right angle to the axis of the spindle and both said short and long edges are sufficiently long so that a portion of said alignment plate extends up through the saw slot when said alignment plate has either of said first and second holes mounted on the spindle;

a miter slot in the machine table substantially at a right angle to the spindle axis and thus substantially parallel to said surface of said plate;

a slide bar having first and second sides which engage within the miter slot, said slide bar having an adjustment slot therein leaving a web adjacent said first side, an adjustment device in said slide bar engaging on said web to resiliently deflect said web to adjust the width of said slide bar to fit in sliding slack-free relationship within the miter slot; and a distance indicator mounted on said slide bar to measure the angularity of the table with respect to said substantially flat surface of said alignment plate and the angularity of the miter plate to said surface of said alignment plate so that the table can be adjusted to a known angle in both a direction normal to the table surface and parallel to the miter slot with respect to said surface, at least one edge of said alignment plate being substantially aligned with the table to enhance measurement accuracy.

7. The alignment system of claim 6 wherein said slide bar has second and third adjustment slots therein adjacent said second side to leave second and third webs, second and third adjustment devices within said slide bar engaging on said second and third webs to resiliently deflect said second and third webs for adjusting the width of said slide bar to slide without slack within the miter slot.

8. The alignment system of claim 7 wherein said distance indicator is a dial indicator is mounted on said slide bar for engaging said alignment plate to measure the parallelism therebetween.

9. The alignment system of claim 6 wherein said distance indicator is a dial indicator is mounted on said slide bar for engaging said alignment plate to measure the parallelism therebetween.

10. An alignment system mounted on a table saw which has a rotating spindle for carrying a circular saw blade, a table for supporting a workpiece with respect to the spindle, a miter slot in the table and a saw slot in the table to permit the saw blade to extend through the table, so that the alignment system permits alignment of the table with respect to the circular saw blade, comprising:

an alignment plate, said alignment plate having at least one substantially flat surface, said alignment plate being substantially rectangular with first and second long edges and first and second short edges, said long edges joining said short edges at substantially right angles and at least first and second holes through said alignment plate, each of said first and second holes being away from the center of said alignment plate, one of said holes being opposite said first short edge and the other of said holes being opposite another edge, said first short edge being sufficiently short and said plate being sufficiently thin to extend through the saw slot so that said alignment plate is mounted with one of said first and second holes on the spindle so that said surface of said alignment plate is a plane at a right angle to the axis of the spindle and both said short and long edges being sufficiently long so that a portion of said alignment plate extends up through the saw slot when said alignment plate has either of said first and second holes mounted on the spindle;

a miter slot in the machine table substantially at a right angle to the spindle axis and thus substantially parallel to said surface of said plate;

a measuring device for mounting on the table to measure the angularity of the table with respect to said substantially flat surface of said alignment plate and the angularity of the miter plate to said surface of said alignment plate so that the table can be adjusted to a known angle in both a direction normal to the table surface and parallel to the miter slot with respect to said surface, at least one edge of said alignment plate being substantially aligned with the table to enhance measurement accuracy, a slide bar having first and second stops thereon, said stops being positioned to engage on the top of said table adjacent said miter slot to limit the depth of entrance of said slide bar into the miter slot so that said slide bar does not engage the bottom of the miter slot so that engagement of the slide bar is only with the sides of the miter slot and adjacent table top.

11. An alignment system for a machine having a spindle running on an axis with a circular saw blade on the spindle and having a table with a saw slot therein adjacent the spindle for supporting a work piece, a miter slot in the table so that the alignment system permits alignment of the table with respect to the circular saw blade, comprising:

a rectangular alignment plate having first and second long edges and first and second short edges for mounting on the spindle, said alignment plate being sufficiently thin to extend through the saw slot in the table, said alignment plate having a surface which lies at a right angle to the spindle axis, a hole through said alignment plate for mounting said alignment plate on the spindle in a position where it extends through the saw slot in the table; and a slide bar engaging in the miter slot for sliding along the miter slot, a measuring device mounted on said slide bar so that said measuring device can measure the distance between the surface of said plate and the miter slot as said slide bar and said measuring device are moved along the slot for adjusting the table to a desired position wherein the miter slot is parallel to the surface of said alignment plate.

12. The alignment system of claim 11 wherein said slide bar has first and second sides and is dimensioned so that said first and second sides fit within the miter slot so that said sides of said slide bar guide said slide bar as it slides along said miter slot.

13. The alignment system of claim 11 wherein stops extend out of both said first and second sides of said slide bar, said stops engaging on the top of the table adjacent the miter slot so that said slide bar does not engage the bottom of the miter slot.

14. The adjustment system of claim 11 wherein said hole through said alignment plate is a first small hole and there is also a second small hole and there are also first and second large holes through said alignment plate, each of said holes being adjacent an edge of said alignment plate with said first small hole being adjacent said first short edge and said second small hole being adjacent said first long edge, and said first large hole is adjacent said second short edge and said second large hole is adjacent said second long edge so that said alignment plate can be installed in either orientation on two spindle sizes.

15. An alignment system for a machine having a spindle running on an axis, a table adjacent the spindle for supporting a work piece and a miter slot in the table so that the alignment system permits alignment of the table with respect to the circular saw blade, comprising:

an alignment plate for mounting on the spindle and for extending through the saw slot in the table, said alignment plate having a surface which lies at a right angle with respect to the spindle axis when said alignment plate is mounted on the spindle so that said surface of said alignment plate is substantially parallel to the miter slot in the table; and a measuring device for movable mounting in the miter slot of the table, said measuring device including a slide bar engaging in the miter slot for sliding along the miter slot, said slide bar having first and second sides, said bar being dimensioned so that said first and second sides fit within the miter slot so that said sides of said slide bar guide said slide bar as it slides along the miter slot, first and second pins extending through said slide bar so that said pins engage on the table surface adjacent the miter slot to limit the depth the slide bar can enter into the miter slot so that said slide bar does not engage the bottom of the miter slot so that said measuring device can be moved along the length of the miter slot and can measure the distance between the surface of said plate and said measuring device for adjusting the table to a desired position with respect to said alignment plate.

16. The alignment system of claim 15 wherein a dial indicator is mounted on said slide bar to measure the parallelism between said surface and the slot.

17. An alignment system for a machine having a spindle running on an axis, a table adjacent the spindle for supporting a work piece and a miter slot in the table so that the alignment system permits alignment of the table with respect to the circular saw blade, comprising:

an alignment plate for mounting on the spindle and for extending through the saw slot in the table, said alignment plate having a surface which lies at a right angle with respect to the spindle axis when said alignment plate is mounted on the spindle so that said surface of said alignment plate is substantially parallel to the miter slot in the table; and a measuring device for movable mounting in the miter slot of the table, said measuring device including a slide bar engaging in the miter slot for sliding along the miter slot, said slide bar having first and second sides, said bar being dimensioned so that said first and second sides fit within the miter slot so that said sides of said slide bar guide said slide bar as it slides along the miter slot, first and second pins extending through said slide bar so that said pins engage on the table surface adjacent the miter slot to limit the depth the slide bar can enter into the miter slot so that said slide bar does not engage the bottom of the miter slot;

a first adjustment slot in said slide bar parallel to said first side thereof to form a web and an adjustment device in said slide bar for deflecting said web to adjust the width of said slide bar so that it slides smoothly without slack within the miter slot so that said measuring device can be moved along the length of the miter slot and can measure the distance between the surface of said plate and said measuring device for adjusting the table to a desired position with respect to said alignment plate.

18. The alignment system of claim 17 wherein there are second and third adjustment slots in said slide bar adjacent said second side of said slide bar to define second and third webs adjacent said second side of said slide bar and there are second and third adjustment structures for adjustably deflecting said second and third webs so that said slide bar can be adjusted to smoothly slide within the miter slot without slack.

19. The alignment system of claim 18 wherein said stops comprises first and second pins extending through said slide bar so that said pins engage on the table surface adjacent the miter slot to limit the depth the slide bar can enter into the miter slot.

20. The alignment system of claim 18 wherein a dial indicator is mounted on said slide bar to measure the parallelism between said surface and said miter slot.

* * * * *